United States Patent [19]

Kaibach

[11] Patent Number: 5,746,557
[45] Date of Patent: May 5, 1998

[54] EXPANSION DOWEL

[75] Inventor: Werner Kaibach, Buchloe, Germany

[73] Assignee: Hilti Aktiengesellschaft, Schaan, Liechtenstein

[21] Appl. No.: 791,125

[22] Filed: Jan. 30, 1997

[30] Foreign Application Priority Data

Jan. 30, 1996 [DE] Germany .............. 196 03 265.2

[51] Int. Cl.⁶ .............................................. F16B 13/06
[52] U.S. Cl. ................................. 411/60; 411/45; 411/72
[58] Field of Search ............................. 411/45, 48, 57, 411/60, 61, 72, 73

[56] References Cited

U.S. PATENT DOCUMENTS

| | | | |
|---|---|---|---|
| 2,033,100 | 3/1936 | Kellogg | 411/72 X |
| 3,874,264 | 4/1975 | Polos . | |
| 4,968,199 | 11/1990 | Haage et al. | 411/60 X |
| 5,116,176 | 5/1992 | Yousuke | 411/60 |
| 5,342,157 | 8/1994 | Fischer | 411/72 X |

FOREIGN PATENT DOCUMENTS 2218495   9/1974   France .
3622937   1/1988   Germany .

OTHER PUBLICATIONS

European Search Report, No. EP 97 100 18.8 dated May 26, 1997.

*Primary Examiner*—Neill R. Wilson
*Attorney, Agent, or Firm*—Anderson, Kill & Olick, P.C.

[57] ABSTRACT

An expansion dowel including an expansion sleeve one end portion (4) of which receives a load and an opposite portion of which has an expansion region divided into expansion tabs by a plurality of longitudinal slots (7) extending toward a leading end of the expansion sleeve (2), with the expansion tabs (6) being connected with the expansion sleeve (2) by a first ductile joint (5) and having an annular collar (8) interrupted by the longitudinal slots (7), and an expansion member (13) displaceable in an axial through-bore (3) of the expansion sleeve (2) from an initial position to an end position upon expansion of the expansion region of the expansion sleeve (2), with the expansion tabs (6) projecting beyond the annular collar (8) and integrally connected with a distance segment (10) of the expansion sleeve (2), which distance segment collapses radially inward upon expansion of the expansion tabs.

12 Claims, 1 Drawing Sheet

EXPANSION DOWEL

BACKGROUND OF THE INVENTION

The present invention relates to an expansion dowel including an expansion sleeve and an expansion member, with the expansion sleeve having one of its end portions functioning as load-receiving means and another opposite portion of which has an expansion region divided into expansion tabs by a plurality of longitudinal slots extending toward a leading end of the expansion sleeve, with the expansion tabs being connected with the expansion sleeve by a first ductile joint and having an annular collar interrupted by the longitudinal slots, and with an expansion mandrel being displaceable in an axial through-bore of the expansion sleeve from an initial position to an end position upon expansion of the expansion region of the expansion sleeve.

Expansion dowels of the above-described types include an expansion sleeve having a through-bore, an expandable expansion region provided in the leading portion of the expansion sleeve facing in the setting direction, and means for receiving a load provided in its opposite trailing end region, and an expansion element which advances in the through-bore, upon expanding the expansion region, from an initial position to an end position. To enable the expansion of the expansion region by the advancing expansion element, the expansion sleeve is provided with a plurality of longitudinal slots extending toward the leading end of the expansion sleeve, which divide the expansion region into a plurality of expansion tabs. At the trailing end of the longitudinal slots, the expansion tabs are connected with a circumferentially continuous section of the expansion sleeve by a provided ductile joint.

An expansion dowel of the above-described type is disclosed, e.g., in U.S. Pat. No. 5,342,157. The disclosed expansion dowel has an expansion region which tapers toward an annular collar provided at the leading end of the expansion sleeve. The annular collar has a radially directed circumferential cutting edge. Upon expansion of the expansion region, the annular collar penetrates with its cutting edge into the wall of a cylindrical hole and forms a form-locking connection between the impact-type expansion dowel and the masonry. For fixing the impact-type expansion dowel axially during the expansion process, the expansion dowel can be provided with an expansion sleeve having a stop collar which protrudes beyond the region of the hole mouth. The stop collar forms a stop which should prevent the penetration of the expansion dowel up to the hole bottom. In this manner, sufficient free space should be provided in the region of the hole bottom for receiving the leading conical region of the expansion body.

In many areas of applications, it is inconvenient and undesirable for an expansion dowel to extend beyond the hole mouth, rather another requirement may exist that the trailing end surface of the expansion sleeve lie somewhat deeper than the hole mouth or at most be flush with the hole mouth. For this application, in U.S. Pat. No. 5,342,157, in preferred embodiment of the impact-type expansion dowel, there is provided, on the end surface of the expansion sleeve, a spacer cap 14 formed of a plastic material and having a receiving chamber into which the front or leading region of the expansion body can penetrate during the expansion process. The spacer cap serves for retaining the expansion dowel in an axial position during the expansion process. It can easily be seen that the use of the spacer cap makes the expansion process more difficult. The reference discloses that the spacer cap is made of a plastic or similar material. Nevertheless, very high friction forces are generated between the leading end surface of the expansion sleeve and the bearing surface of the spacer cap during the expansion process, which forces oppose the expansion of the expansion sleeve. The expansion dowel consists of two components, the expansion dowel itself and the spacer cap which should be inserted together into the receiving hole. The spacer cap is pinned up at the leading end of the expansion dowel and is held there rather rigidly. However, it is possible that during positioning or manipulation of the expansion dowel at the application site, the spacer cap drops off. However, without the spacer cap, the expansion dowel cannot be properly inserted, or at least, cannot be reliably expanded.

This conventional expansion dowel is often called an impact-type expansion dowel because it is anchored in a receiving hole upon expansion of the expansion sleeve by impact advance of the expansion body in the through-bore of the expansion sleeve. The applied axial force, on account of the shape of the expansion body and/or the shape of the through-bore which tapers in the setting direction, is divided into radial and axial components. The radial force component results in the expansion of the expansion sleeve. The axial force component passes either into the outer surface of the ground through the stop collar or into the hole bottom through the spacer cap, and does not take part in the expansion of the expansion sleeve. In this conventional expansion dowel, a not unsubstantial portion of the applied force remains unused and is lost.

Accordingly, the object of the present invention is to provide an expansion dowel which would use the applied expansion energy most efficiently. The conception of the expansion dowel should prevent a loss of an applied axial force. The expansion dowel should be axially fixed in the receiving hole and should be positioned in an application area so that no component of the expansion dowel extends above the receiving hole mouth. The provided expansion dowel should insure its simple positioning and handling and should be insertable in a receiving hole without any preliminary measures. It should provide for high pull-out values at relatively small setting forces, without damaging the adjoining wall of the receiving hole. The expansion dowel should provide a form-locking connection with the wall of the receiving hole during the expansion process and should be appropriate for use in an area of a constructional component which is subjected to action of tensile forces.

SUMMARY OF THE INVENTION

The above-listed objects are achieved by providing an expansion dowel of the above-described type in which the expansion tabs project beyond the annular collar and are connected with a distance segment of the expansion sleeve by a second ductile joint, which distance segment collapses radially inward upon expansion displacement of the expansion tabs. The expansion dowel according to the present invention includes an expansion sleeve one end portion of which has an expansion region divided into expansion tabs by a plurality of longitudinal slots extending toward a leading end of the expansion sleeve with the expansion tabs being connected with the expansion sleeve by a first ductile joint and having an annular collar interrupted by the longitudinal slots. An expansion member is displaceable in an axial through-bore of the expansion sleeve from an initial position to an end position upon expansion of the expansion region of the expansion sleeve, and the expansion tabs project beyond the annular collar and are integrally connected with a distance segment of the expansion sleeve by a second ductile joint, with the distance segment collapsing radially inward upon expansion displacement of the expansion tabs.

The lengthening, according to the present invention, of the expansion tabs beyond the annular collar provides for axial retention of the expansion dowel in the receiving hole during the expansion process. A trailing stop collar can be eliminated, and no component of the expansion dowel projects from the hole mouth. Sufficient place for receiving the leading region of the advanced expansion member remains between the annular collar and the hole bottom. The distance segment is supported on the hole bottom. The second ductile joint between the elongated expansion tabs and the distance segment provides for collapsing of the distance segment inward upon expansion displacement of the expansion tabs and for the conversion of the axial force component into a ductile torque which amplifies the expansion torque generated by the radial force component. This reduces the necessary expansion energy. Losses resulting from friction between engaging each other axial surfaces are prevented. The expansion tabs are formed integrally with the expandable section. The expansion dowel according to the present invention therefore need not be assembled before its use from two components but can be used directly. This facilitates the retention of the expansion dowel in its position and its handling. Therefore, the danger that an important element of the expansion dowel becomes lost or that the expansion dowel, because of a failed component, is unsatisfactorily anchored in the receiving hole, is eliminated. The annular collar in the region of the expansion tabs automatically provides for a form-locking connection between the expansion dowel and the wall of the receiving hole during the expansion process. The form-locking connection assists the force-locking positioning of the expanded expansion dowel in the receiving hole and enables its use in an area of a constructional part subjected to tensile forces.

It is advantageous when the through-bore tapers from the first ductile joint in a direction toward the second ductile joint up to a region of a smallest bore diameter which is located in the region of the annular collar. At that, the wall of the bore forms with the longitudinal axis of the expansion sleeve an angle from about 80 to about 130, preferably of about 100. Starting from the region of the annular collar, the bore then widens toward the free leading end of the distance segment. Providing the smallest bore diameter in the region of the annular collar results in generation of the largest expansion pressure in this region which insures a form-locking connection of the expansion dowel with the wall of the receiving hole. Further, the smallest constriction for the expansion body is also formed in this region, which constriction retains the expansion body in its advanced end position so that the expansion body cannot move backward any more. The angle, which the bore wall forms with the axis of the expansion sleeve insures that the forces, which occur during expansion, are retained within certain limits and that the expansion body can be advanced in the through-bore from its initial position to its end position even in the most rigid foundation.

The fact that the expansion sleeve has, in the region of the distance segment, a smaller diameter than in the region of the annular collar, insures that the expansion dowel can be advanced in a receiving hole, which narrows toward the hole bottom, and will not project above the hole mouth. In addition, the geometry of the expansion dowel according to the present invention provides for conversion of the axial force.

In an advantageous embodiment of an expansion dowel according to the present invention, the free end surface of the distance segment is spherically shaped, with the frontmost end of the distance segment being radially spaced from the axis of the expansion sleeve a distance which is smaller than the radial distance of the second ductile joint from the expansion sleeve axis. Due to the spherically shaped curvature of its free end surface, the distance segment is able roll inward along the bottom of the receiving hole. By selecting the radial distance of the frontmost end of the distance segment from the expansion sleeve axis, the tendency of the distance segment to collapse inward, upon the expansion displacement of the expansion tabs, can be reinforced.

The force redirecting of the axial component into a radially acting torque can be optimized by selecting the axial length of the distance segment, which is measured from the second ductile joint to the front end of the distance segment, such that it equals from about 0.19 to about 0.2 of the total length of the expansion tabs measured from the first ductile joint to the front end of the expansion sleeve.

The redirecting force is reinforced by forming the through-bore so that it is cylindrically shaped from the second ductile joint in the front end of the distance segment and has a diameter equal from about 1.7 to about 1.85 of the distance segment length. With this dimensional ratio, sufficient space for the leading region of the advanced expansion body remains when the distance segment folds in a direction to the expansion sleeve axis.

The achievable pull-out values of the expansion dowel are increased by forming the expansion tabs so that they have, in the region between the first ductile joint and the annular collar, a substantially concave contour which passes into the annular collar so that the tangent to the outer contour line in the transition region forms with the expansion sleeve axis an angle of 90°. In the concave region, there is provided a construction having an outer diameter the ratio of which to the outer diameter of the expansion sleeve in its region of the load-receiving means is from about 0.81 to about 0.83. The geometry of the expansion sleeve according to the present invention insures that in the expanded condition, the outer surface of the expansion sleeve lies substantially flatly on the wall of the receiving hole over its entire longitudinal extent. This insures an increased force-locking connection between the expansion sleeve and the hole wall. The shape of the transitional region between the outer contour and the annular collar insures almost an ideal force-locking connection with only a small expansion pressure, with a greatest possible improvement of the adjoining wall of the receiving hole.

In an advantageous embodiment of an expansion dowel according to the present invention, the concave region of the expansion tabs has a length a ratio of which to the outer diameter of the constriction is from about 1.22 to about 1.27, in particular, from about 1.24 to about 1.25. This geometry of the concave region of the expansion sleeve further optimizes the force-locking connection between the outer surface of the expansion region and the wall of the receiving hole and permits to achieve even higher pull-out values. From the point of view of symmetry, it is advantageous when the constriction is formed approximately in the middle of the longitudinal extent of the concave region.

The expansion region of the expansion sleeve has from four to eight, preferably six, expansion tabs. The larger number of expansion tabs, in particular in expansion dowel with larger diameters, permits to reduce the required expansion force.

BRIEF DESCRIPTION OF THE DRAWINGS

The present invention, together with all important particularities thereof, will be described in detail below with reference to a preferred embodiment of the invention shown in the accompanying drawings, wherein.

DETAILED DESCRIPTION OF THE PREFERRED EMBODIMENT

Figure 1:
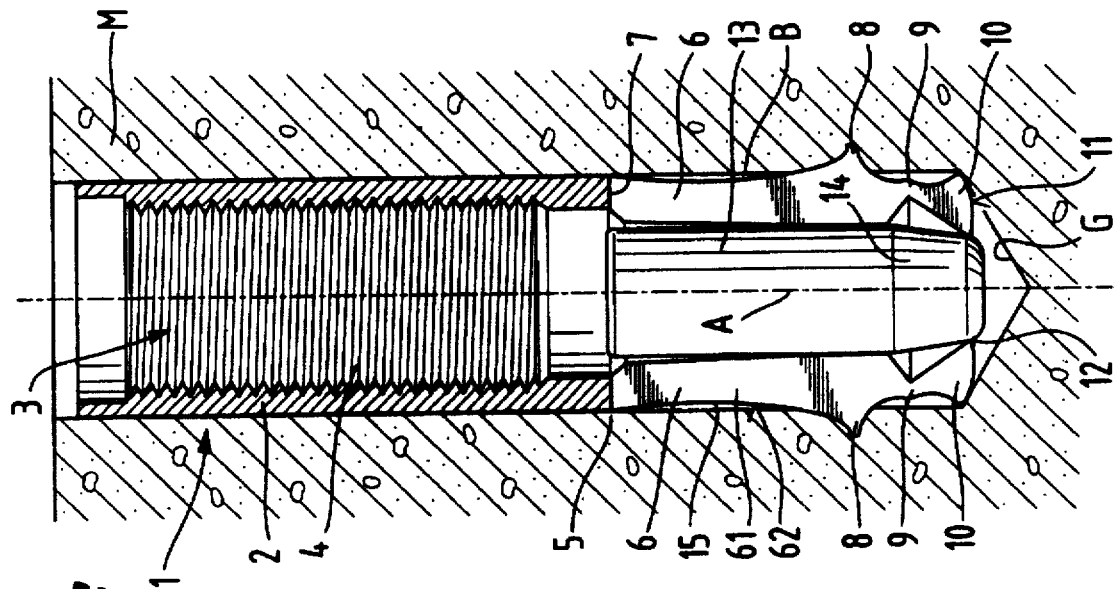
FIG. 1 is an axial cross-sectional view of an expansion dowel according to the present invention.
Figure 2:
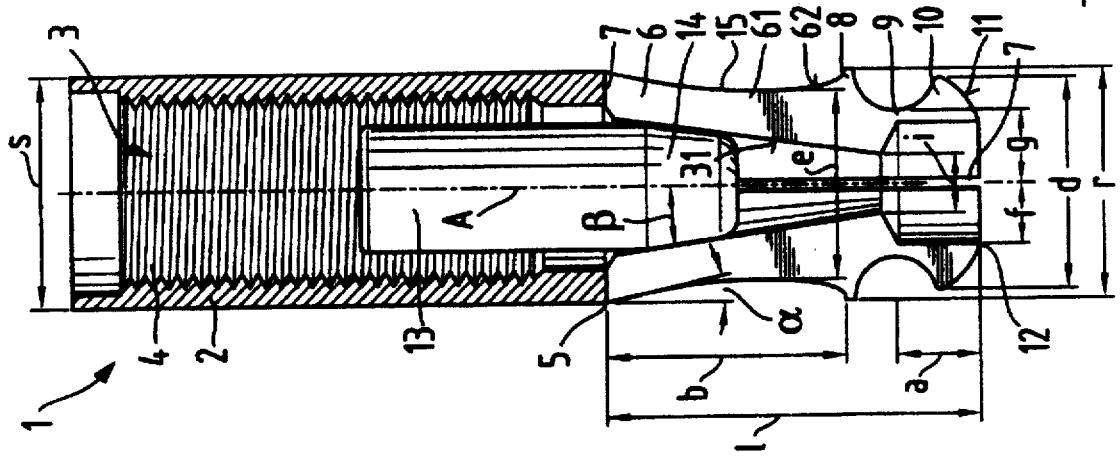
FIG. 2 is an axial cross-sectional view of the expansion dowel shown in FIG. 1 in an expanded condition.

An expansion dowel according to the present invention, which is shown in FIGS. 1 and 2, is designated with a reference numeral 1. The dowel includes an expansion sleeve 2 having a through-bore 3. The expansion sleeve 2 is provided, at a trailing end thereof, with an internal thread 4 for receiving a load. The opposite portion of the expansion sleeve 2 is formed as an expansion region. The expansion region is divided by a plurality of longitudinal slots 7 into expansion tabs 6. A first ductile joint 5 integrally connects the tabs 6 with the adjoining trailing portion of the expansion sleeve 2. In the shown embodiment of the expansion dowel according to the present invention, there are provided four expansion tabs 6. However, dependent on the diameter of the expansion dowel, up to eight expansion tabs 6 can be formed. In particular, a greater number of expansion tabs 6 is provided in expansion dowels having larger diameters. Providing six expansion tabs 6 proved to be a good compromise between a desired ease of expansion of the expansion region of the dowel and an availability of a sufficiently large continuous anchoring surface.

The expansion tabs 6 have a region 61 with a concave outer contour extending from the first ductile joint 5 up to annular collar 8. The inclination angle a, at which a tangent to the outer surface 62 in the region of the first ductile joint 5 extends toward the axis A of the expansion sleeve 2, equals from about 80 to about 90 and, preferably, is about 8.5°. The conical region 61 narrows up to a constriction 15 which is provided somewhat in the middle of a longitudinal extent of the conical region 61. The ratio of an outer diameter e of the constriction 15 to an outer diameter s of the expansion sleeve 2 in the region of the internal thread 4 is from about 0.81 to about 0.83. The outer diameter of the concave region 61 widens from the constriction 15 to the annular collar 8. The transition from the concave region 61 to the annular collar 8 is so shaped that a tangent to the outer surface 62 forms with the axis A of the expansion sleeve 2 an angle of about 90°. The ratio of the length b of the concave region 61 to the outer diameter e of the constriction 15 is from about 1.22 to about 1.27 and, preferably, from about 1.24 to about 1.25.

The expansion tabs 6 project beyond the annular collar 8 and are integrally connected with a distance segment 10 by a second ductile joint 9. The outer diameter d of the expansion sleeve 2 in the region of the distance segment 10 is smaller than the outer diameter r in the region of the annual collar 8. The length a of the distance segment 10, which is measured from the second ductile joint 9 up to the front end of the expansion sleeve 2 equals from about 0.19 to about 0.2 of the total length 1 of the expansion tabs 6. The front end of the expansion sleeve 2 defines the frontmost end 12 of the distance segment 10. The free end surface 11 of the distance segment 10 has a shape of a portion of a sphere. The radial distance of the frontmost end 12 of the spaced segment 10 from the axis A of the expansion sleeve 2 is smaller than the radial distance g of the second ductile joint 9 from the axis A. The axial length of the spaced segment 10 equals a distance from a region adjacent to the bore 3 to the circumference of the expansion sleeve 2.

The bore 3 of the expansion sleeve 2 has a cylindrical shape in the trailing region of the expansion sleeve 2 provided with an internal thread 4. Between the first ductile joint 5 and the annular collar 8, the bore 3 tapers up to a smallest diameter i lying in the region of the annular collar 8. In the conical region of the bore 3, the wall 31 of the bore 3 forms with the axis A of the expansion sleeve an angle β from about 8° to about 13°, preferably, 10°. From the region with the smallest diameter i, the bore 3 widens toward the leading end of the expansion sleeve 2. From the second ductile joint 9 to the frontmost end 12 of the distance segment 10, the bore 3 has a substantially cylindrical shape. The inner diameter of the bore 3 in the region of the distance segment 10 is twice of the radial distance f of the frontmost end 12 of the distance segment 10 from the axis A of the expansion sleeve 2, and its ratio to the length a of the distance segment 10 is from about 1.7 to about 1.85.

The expansion dowel 1 includes an expansion member or mandrel 13 which is advanced in the bore 3 from an initial position to an end position upon expansion of the expansion tabs 6. FIG. 1 shows the expansion member 13 in its initial position in which the front region 14 of the mandrel 13 remains captive in the bore 3. FIG. 2 shows the expansion mandrel 13 in its advanced end position. The expansion dowel 1, which is inserted in a receiving hole B formed in masonry M, force-lockingly engages the wall of the receiving hole with outer surface 62 of the expansion tabs 6. In addition, the annular collar 8 forms, as a result of the expansion, a form-locking connection with the wall of the receiving hole B. The distance segment 10 collapses inward toward the axis A of the expansion sleeve 2 due to deformation of the second ductile joint 9, and the spherical end surface 11 rolls off the bottom of the receiving hole M. The front region 14 of the expansion member 13 is received in the cylindrical portion of the bore 3 in the the region of the distance segment 10. However, the front region 14 can be formed with a conically-shaped extension, as shown in the drawings. Instead of the conical extension, the front region 14 of the expansion member 13 can have an extension in the form of a spherical segment. However, the expansion member 13 can have a substantially cylindrical shape along its entire longitudinal extent, or can have a shape of a barrel along its longitudinal extent.

Though the present invention was shown and described with reference to the preferred embodiment, various modifications thereof will be apparent to those skilled in the art and, therefore, it is not intended that the invention be limited to the disclosed embodiment or details thereof, and departure can be made therefrom within the spirit and scope of the appended claims.

What is claimed is:

1. An expansion dowel, comprising an expansion sleeve (2) one end portion (4) of which functions as a load-receiving means and an opposite portion of which has an expansion region divided into expansion tabs (6) by a Plurality of longitudinal slots (7) extending toward a leading end of the expansion sleeve (2), the expansion tabs (6) being connected with the expansion sleeve (2) by a first ductile joint (5) and having an annular collar (8) interrupted by the longitudinal slots (7); and an expansion mandrel (13) displaceable in an axial through-bore (3) of the expansion sleeve (2) from an initial position to an end position upon expansion of the expansion region of the expansion sleeve (2), the expansion tabs (6) protecting beyond the annular collar (8) and being integrally connected with a distance segment (10) of the expansion sleeve (2) by a second ductile joint (9), the distance segment (10) collapsing radially inward upon an expansion displacement of the expansion tabs (6), the through-bore (3) tapers from the first ductile joint (5) in a direction toward the second ductile joint (9) up to a region with a smallest bore diameter (i) which is located in a region of the annular collar (8), and wherein a wall (31) of the through-bore (3) forms with a longitudinal axis (A) of the expansion sleeve (2) an angle (α) from about 8° to about 13°, the wall (31) widening again from the region with the smallest bore diameter (i).

2. An expansion dowel according to claim 1, wherein the angle (α) between the wall (31) of the through-bore (3) and the longitudinal axis (A) of the expansion sleeve (2) is about 10°.

3. An expansion dowel, comprising an expansion sleeve (2) one end portion (4) of which functions as a load-receiving means and an opposite portion of which has an expansion region divided into expansion tabs (6) by a Plurality of longitudinal slots (7) extending toward a leading end of the expansion sleeve (2), the expansion tabs (6) being connected with the expansion sleeve (2) by a first ductile joint (5) and having an annular collar (8) interrupted by the longitudinal slots (7); and an expansion mandrel (13) displaceable in an axial through-bore (3) of the expansion sleeve (2) from an initial position to an end position upon expansion of the expansion region of the expansion sleeve (2), the expansion tabs (6) projecting beyond the annular collar (8) and being integrally connected with a distance segment (10) of the expansion sleeve (2) by a second ductile joint (9), the distance segment (10) collapsing radially inward upon an expansion displacement of the expansion tabs (6) the expansion sleeve (2) has, in a region of the distance segment (10), an outer diameter (d) which is smaller than an outer diameter (r) of the expansion sleeve (2) in the region of the annular collar (8).

4. An expansion dowel, comprising an expansion sleeve (2) one end portion (4) of which functions as a load-receiving means and an opposite portion of which has an expansion region divided into expansion tabs (6) by a Plurality of longitudinal slots (7) extending toward a leading end of the expansion sleeve (2), the expansion tabs (6) being connected with the expansion sleeve (2) by a first ductile joint (5) and having an annular collar (8) interrupted by the longitudinal slots (7); and an expansion mandrel (13) displaceable in an axial through-bore (3) of the expansion sleeve (2) from an initial position to an end position upon expansion of the expansion region of the expansion sleeve (2), the expansion tabs (6) projecting beyond the annular collar (8) and being integrally connected with a distance segment (10) of the expansion sleeve (2) by a second ductile joint (9), the distance segment (10) collapsing radially inward upon an expansion displacement of the expansion tabs (6), a free end surface (11) of the distance segment (10) is spherically shaped, and a frontmost end (12) of the distance segment (10) is spaced from a longitudinal axis (A) of the expansion sleeve (2) by a radial distance (f) which is smaller than a radial distance (g) of the second ductile joint (g) from the longitudinal axis (A) of the expansion sleeve (2).

5. An expansion dowel, comprising an expansion sleeve (2) one end portion (4) of which functions as a load-receiving means and an opposite portion of which has an expansion region divided into expansion tabs (6) by a plurality of longitudinal slots (7) extending toward a leading end of the expansion sleeve (2), the expansion tabs (6) being connected with the expansion sleeve (2) by a first ductile joint (5) and having an annular collar (8) interrupted by the longitudinal slots (7); and an expansion mandrel (13) displaceable in an axial through-bore (3) of the expansion sleeve (2) from an initial position to an end position upon expansion of the expansion region of the expansion sleeve (2), the expansion tabs (6) projecting beyond the annular collar (8) and being integrally connected with a distance segment (10) of the expansion sleeve (2) by a second ductile joint (9), the distance segment (10) collapsing radially inward upon an expansion displacement of the expansion tabs (6), an axial length (a) of the distance segment (10), measured from the second ductile joint (9) to a frontmost end (12) of the distance segment (10), equals from about 0.19 to about 0.2 of a total length (l) of the expansion tabs (6) measured from the first ductile joint (5) to a front end of the expansion sleeve (2) which coincides with the frontmost end (12) of the distance segment (10).

6. An expansion dowel according to claim 5, wherein the through-bore (3) has a cylindrical shape from the second ductile joint (9) to the frontmost end (12) of the distance segment (10) and has a diameter (f+f) a ratio of which to the length (a) of the distance segment (10) is from about 1.7 to about 1.85.

7. An expansion dowel, comprising an expansion sleeve (2) one end portion (4) of which functions as a load-receiving means and an opposite portion of which has an expansion region divided into expansion tabs (6) by a plurality of longitudinal slots (7) extending toward a leading end of the expansion sleeve (2), the expansion tabs (6) being connected with the expansion sleeve (2) by a first ductile joint (5) and having an annular collar (8) interrupted by the longitudinal slots (7); and an expansion mandrel (13) displaceable in an axial through-bore (3) of the expansion sleeve (2) from an initial position to an end position upon expansion of the expansion region of the expansion sleeve (2), the expansion tabs (6) protecting beyond the annular collar (8) and being integrally connected with a distance segment (10) of the expansion sleeve (2) by a second ductile joint (9), the distance segment (10) collapsing radially inward upon an expansion displacement of the expansion tabs (6), the expansion tabs (6) have, in a region (61) thereof between the first ductile joint (5) and the annular collar (8), a substantially concave contour which passes into the annular collar (8) so that a tangent to an outer surface (62) of an expansion tab (6) in the region (61) forms with a longitudinal axis (A) of the expansion sleeve (2) an angle of about 90°, and wherein the concave region (61) has a constriction (15) with an outer diameter (e) a ratio of which to an outer diameter (s) of the expansion sleeve (2) equals from about 0.81 to about 0.83.

8. An expansion dowel according to claim 7, wherein the concave region (61) of the expansion tabs (6) has a length (b) a ratio of which to the outer diameter (e) of the constriction (15) equals from about 1.22 to about 1.27

9. An expansion dowel according to claim 8, wherein the ration between the length (b) of the expansion tabs (6) to the outer diameter (e) of the constriction (15) equals from about 1.24 to 1.25.

10. An expansion dowel according to claim 7, wherein the constriction (15) is provided approximately in a middle of a longitudinal extent of the concave region (61).

11. An expansion dowel according to claim 1, wherein the dowel has from four to eight expansion tabs.

12. An expansion dowel according to claim 11, wherein the dowel has six expansion tabs.

* * * * *